United States Patent [19]

Altherr et al.

[11] Patent Number: 4,871,182

[45] Date of Patent: Oct. 3, 1989

[54] FIFTH WHEEL UNLOCKING AND SAFETY LATCH DEVICE

[75] Inventors: Russell G. Altherr, Munster, Ind.; Richard L. Glaser, Glendale Heights, Ill.; Francis E. Madura, Whiting, Ind.; Robert P. Radwill, Vero Beach, Fla.

[73] Assignee: AMSTED Industries Incorporated, Chicago, Ill.

[21] Appl. No.: 160,638

[22] Filed: Feb. 26, 1988

[51] Int. Cl.$^4$ .................... B62D 53/10; B62D 53/12
[52] U.S. Cl. ................................. 280/434; 280/437
[58] Field of Search ............... 280/432, 433, 434, 436, 280/437, 446 R

[56] References Cited

U.S. PATENT DOCUMENTS

| | | | |
|---|---|---|---|
| 1,929,220 | 10/1933 | Steinhauer | 280/434 |
| 2,861,818 | 11/1958 | Kayler et al. | 280/434 |
| 2,925,286 | 2/1960 | Hodges, Jr. et al. | 280/434 |
| 3,224,788 | 12/1965 | Steinway | 280/434 |
| 3,827,709 | 8/1974 | Madura et al. | 280/439 |

Primary Examiner—Mitchell J. Hill
Attorney, Agent, or Firm—Charles E. Bouton; Edward J. Brosius

[57] ABSTRACT

A fifth wheel for an over the road tractor having an operating rod for the locking mechanism which requires only longitudinal and rotary motion thus facilitating operation thereof in the space between tractor frame and trailer and permitting that space to be reduced in that no vertical lifting motion is imparted to the operating rod.

19 Claims, 5 Drawing Sheets

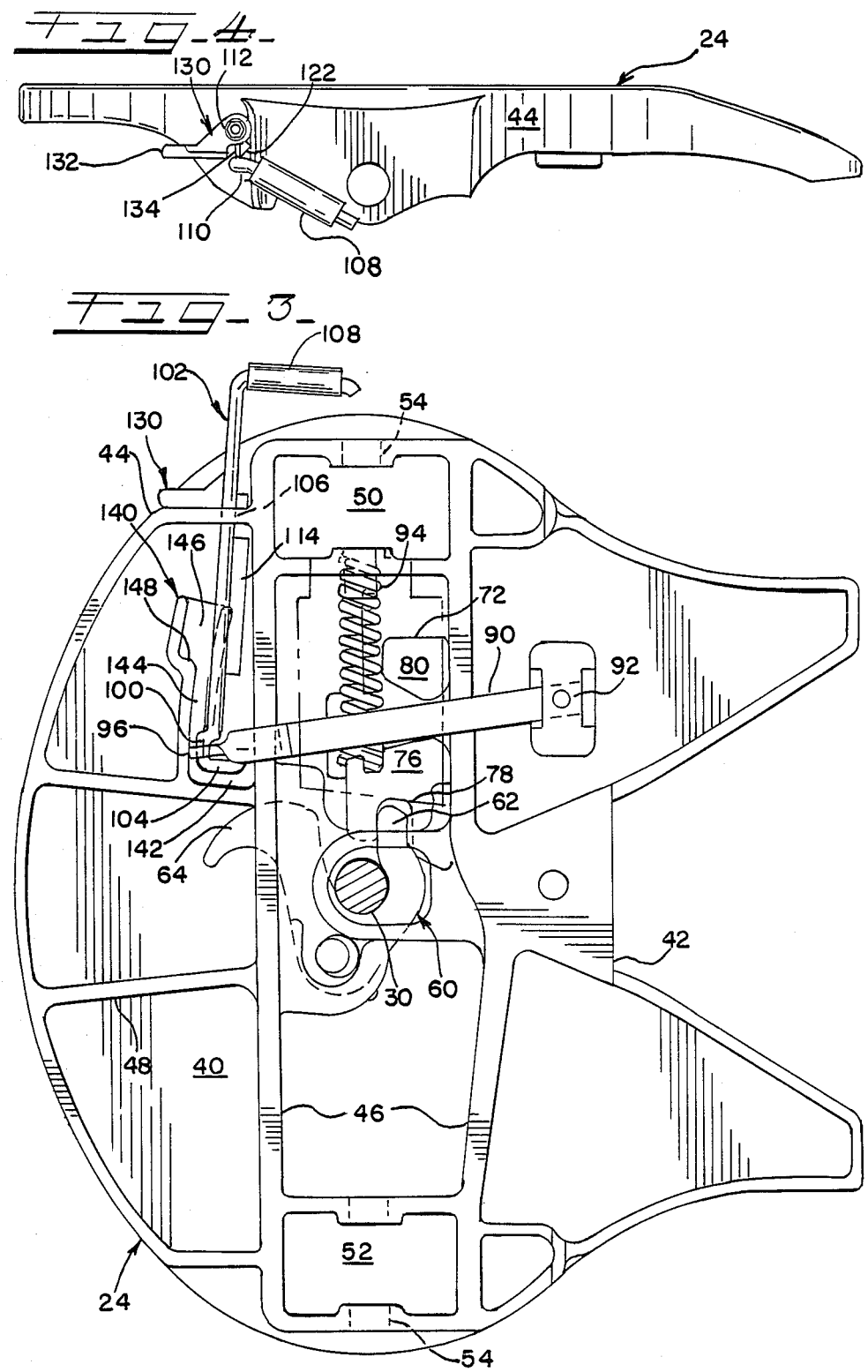

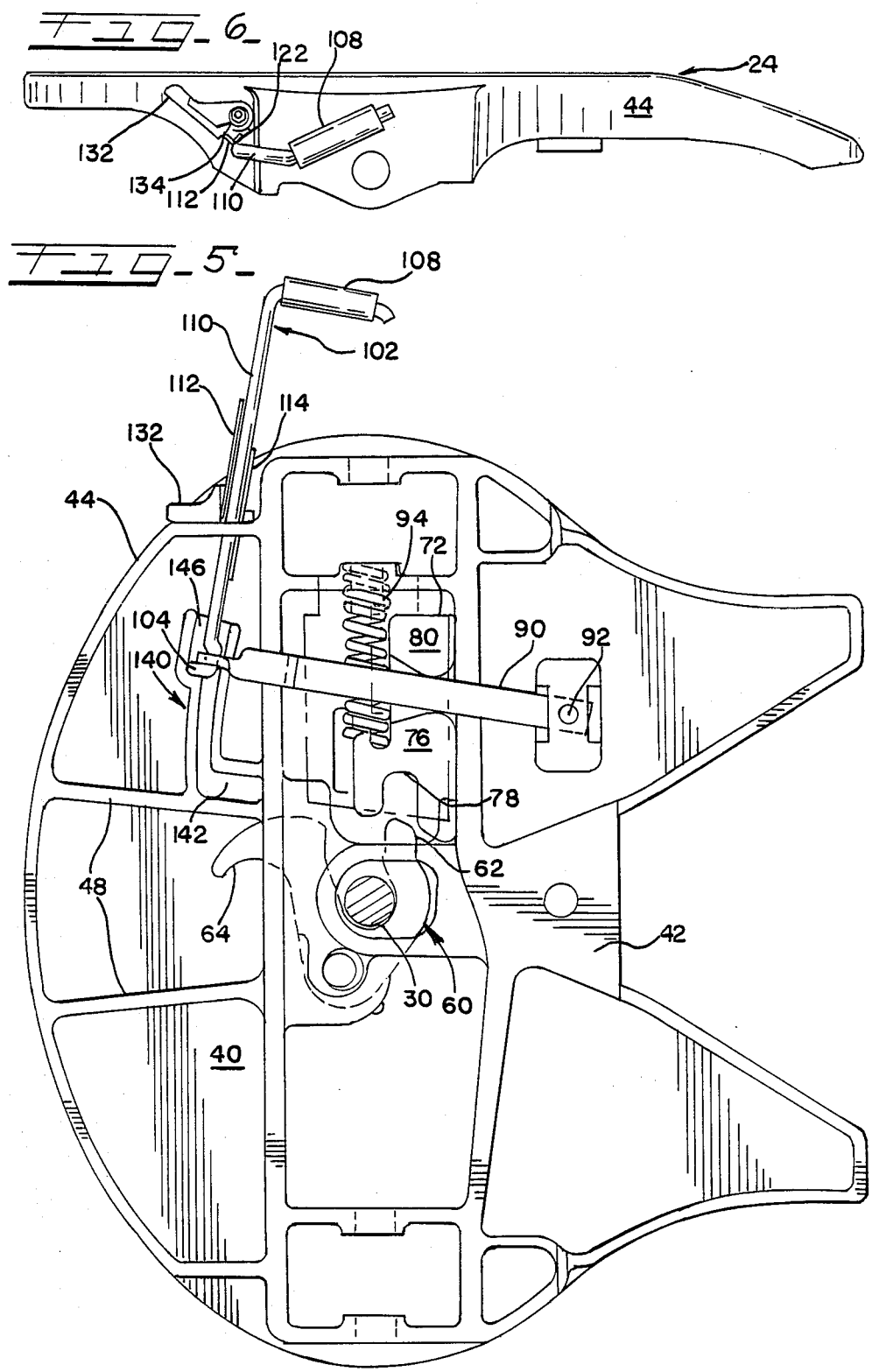

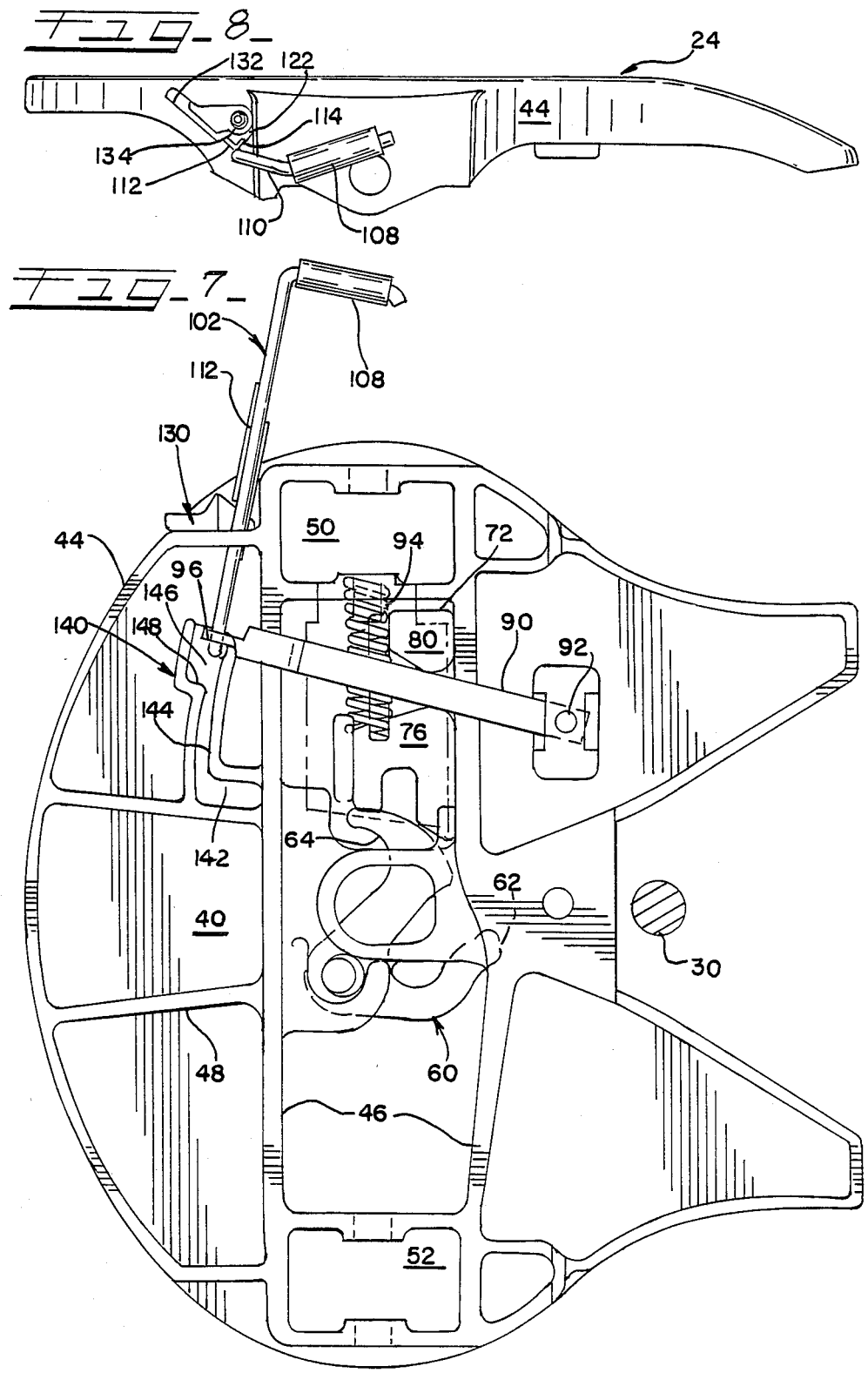

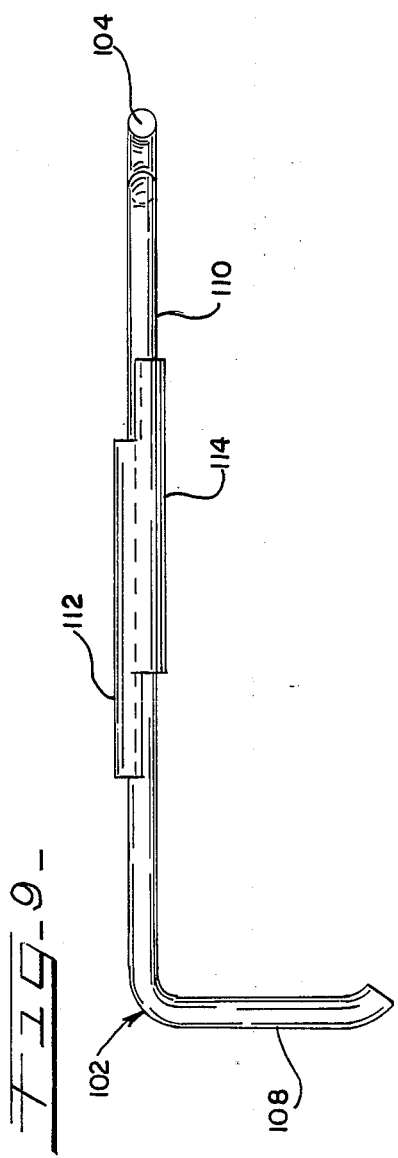
FIG-9-
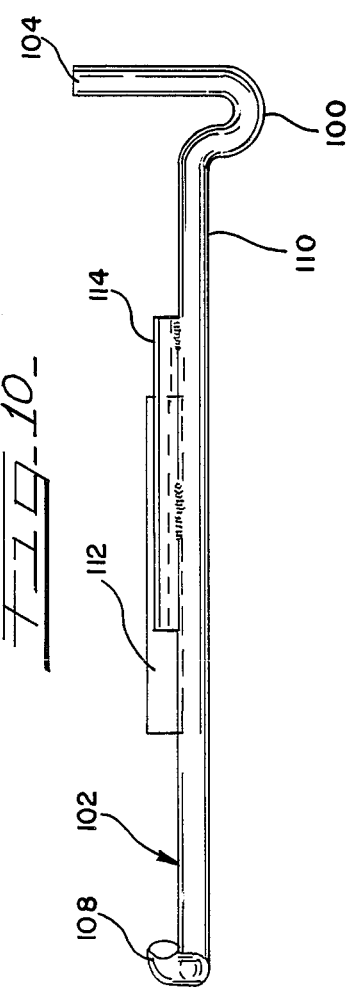
FIG-10-
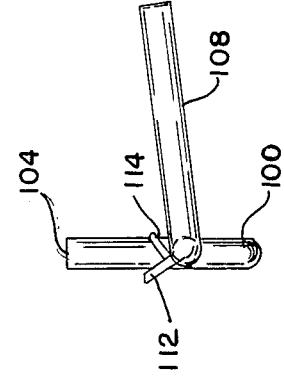
FIG-11-

FIFTH WHEEL UNLOCKING AND SAFETY LATCH DEVICE

FIELD OF THE INVENTION

The present invention relates to fifth wheels for over the road tractors by which trailers are demountably connected to the tractors, and more particularly to an improved apparatus for unlocking the connection to a trailer.

BACKGROUND OF THE INVENTION

Fifth wheel devices include a plate which supports the forward bed plate of a trailer. A king pin is fixed to the trailer bed plate and extends into a center opening of the fifth wheel plate. Fifth wheels have included a pivotally mounted jaw to engage and hold the king pin. Usually the king pin includes a reduced diameter neck and an enlarged end and the fifth wheel jaw surrounds the neck of the king pin so as to prevent it being disengaged either vertically or horizontally. Normally the jaw closes and is locked on the king pin as the tractor and trailer are brought together. However, there is also a mechanism provided to unlock the jaw to permit release of a king pin and allow separation of tractor and trailer. That mechanism must, for safety reasons, be manually operated by a driver or assistant and must include safeguards so as to avoid accidental release. However, the mechanism is normally an integral part of the fifth wheel structure and may be reached only by a driver reaching and leaning between trailer and tractor tires where there is minimal room to manipulate the mechanism.

Heretofore the mechanism for unlocking a fifth wheel jaw has usually required imparting a vertical lift to an operating rod. Unfortunately, vertical movement is difficult in the cramped space between trailer bed and tractor tires; and there is an increased available payload incentive to reduce the vertical dimension of that space to a minimum since a shorter vertical distance between trailer bed and tractor frame allows for a larger permissible vertical dimension of the trailer forward cargo space. Thus there is an advantage to minimizing the vertical dimension of the fifth wheel apparatus and any space required for its proper operation.

SUMMARY OF THE PRESENT INVENTION

Accordingly, it is an object of the present invention to reduce the vertical dimension required for a tractor fifth wheel.

It is another object of the present invention to eliminate any need for lifting motion to unlock a fifth wheel.

It is a further object of the present invention to provide an operating rod for a fifth wheel unlocking mechanism that requires only longitudinal and rotary motion.

It is still another object of the present invention to provide an improved fifth heel unlocking device that is secure against unintended release of a king pin engaging jaw.

The present invention utilizes an operating rod that is held beneath a fifth wheel plate in a way that limits its motion to longitudinal and rotary movements and wherein an inward end of the operating rod cooperates with a guiding means to correspond with positions of the locking mechanism and require a sequence of rotary and longitudinal movements to release the locking mechanism.

BRIEF DESCRIPTION OF THE DRAWINGS

Further objects and advantages of the invention will become apparent from the following detailed description taken in conjunction with the drawings wherein:

FIG. 3 is a bottom view of a fifth wheel incorporating the present invention with a jaw in a first locked position;

FIG. 4 is a side view of the device of FIG. 3;

FIG. 5 is a bottom view of the device of FIG. 3 in a second position;

FIG. 6 is a side view of the device of FIG. 5;

FIG. 7 is a bottom view of the device of FIG. 3 in a third, unlocked and open, position;

FIG. 8 is a side view of the device of FIG. 7;

FIG. 9 is a plan view of an operating rod removed from the device of FIGS. 2-8;

FIG. 10 is a side view of the operating rod of FIG. 9; and

FIG. 11 is an end view of the operating rod of FIG. 9.

DETAILED DESCRIPTION

Figure 1:
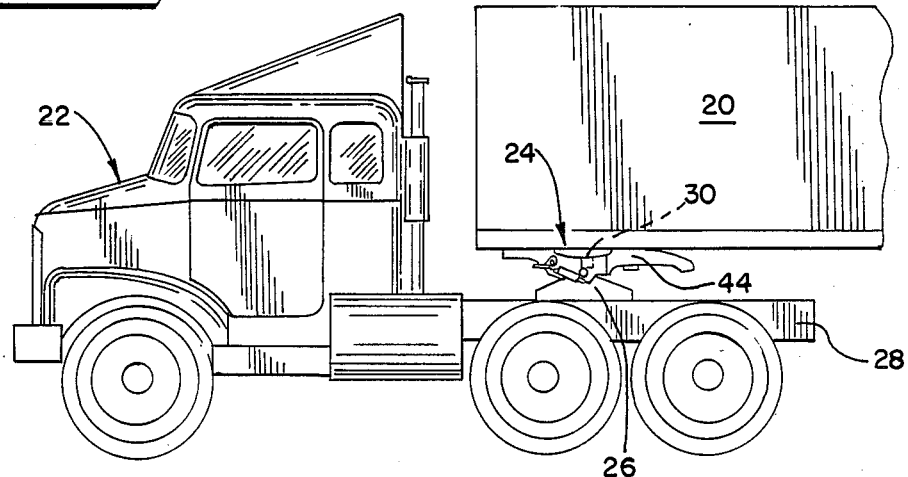
FIG. 1 is a side view of a tractor and trailer with a fifth wheel mounting.

Referring to FIG. 1 which generally illustrates an over the road trailer 20 and tractor 22 having a fifth wheel generally 24 pivotally mounted on brackets 26 secured to the tractor frame 28 which receives and engages a king pin 30 secured to the underside of the forward bed plate of the trailer 20. According to the prior art the fifth wheel 24 included a locking mechanism to engage and hold the king pin 30 and an operating lever which was lifted and pulled to release the locking mechanism. As earlier indicated the prior operating rod movement required a sufficient vertical space be maintained between the tractor frame 28 and the bed plate of the trailer 20.

Figure 2:
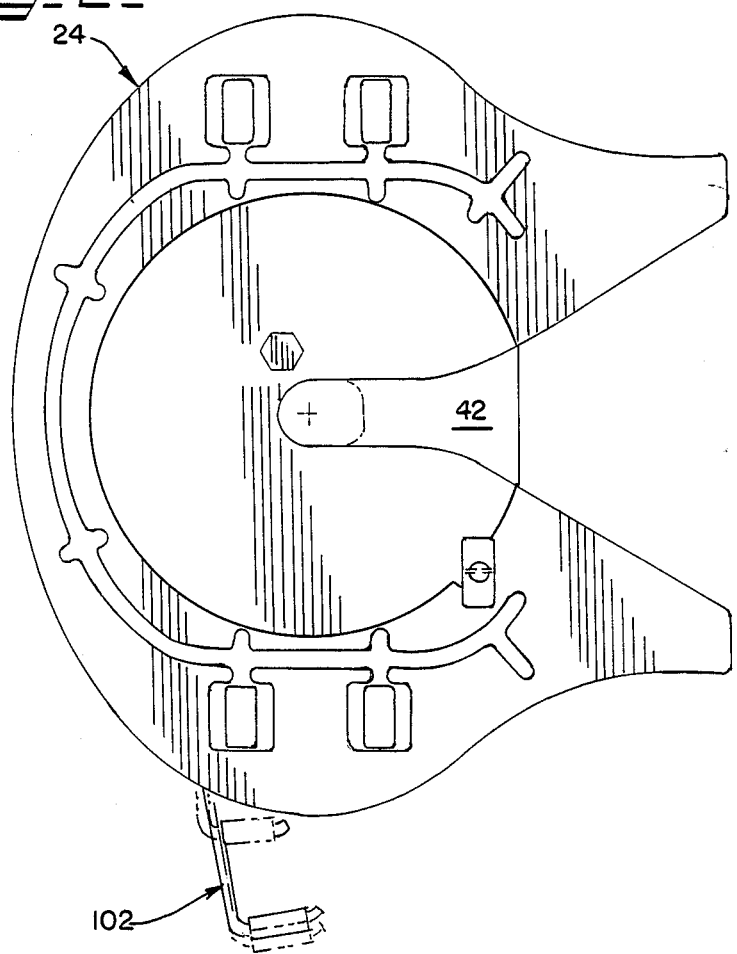
FIG. 2 is a plan view of a fifth wheel.

A preferred embodiment of the present invention comprising a low silhouette fifth wheel with an improved lock operating handle is shown in FIGS. 2 through 11. In FIG. 2 the fifth wheel, generally 24, is shown to comprise a trailer support plate 40 having an open "V" slot 42 to receive (and release) a trailer king pin 30. The periphery of the plate 40 is in the form of a depending skirt 44 (best seen in FIG. 4); and as may be seen in FIG. 3 the underside of the plate 40 has a pair of lateral strengthening webs 46 and additional webs 48 to provide rigidity.

Preferably the fifth wheel plate 40, skirt 44 and webs 46, 48 are integrally cast from steel. The webs and skirt are arranged to form pockets 50, 52 (at opposite sides of the plate 40 aligned with the king pin opening at the end of slot 42) to rockingly rest upon the mounting brackets 26; and holes 54 are provided to receive pivot pins (not shown) which secure the fifth wheel 24 to the mounting brackets 26.

As shown in FIG. 3 a jaw generally 60 is pivotally mounted to the underside of plate 40 and positioned to swing across the apex of the "V" shaped pin slot 42. The jaw 60 is bifurcated into a detent portion 62 and a foot portion 64 with an opening therebetween. The jaw 60 is shown in a closed and locked position in FIG. 3 whereby a reduced diameter neck portion of a king pin 30 would be engaged within the jaw opening at the apex of the pin slot 42 and thereby prevented from vertical or horizontal extraction. The jaw 60 will automatically assume a closed and locked position shown in FIG. 3 when a trailer 20 is moved forwardly onto the fifth wheel 24 so as to advance a king pin 30 through the slot 42 and against the inner portion of jaw foot 64. In FIG. 7 the jaw 60 is shown in an open position ready to receive a king pin 30 within the opening between its foot 64 and detent 62 portions; and in FIG. 5 the jaw 60 is shown in a closed but unlocked condition which will allow a king pin (and trailer) to be released and extracted horizontally.

In FIGS. 3, 5 and 7 a locking mechanism generally 70 is also shown comprising a slidable bolt 72 held against the underside of the fifth wheel plate 40 by a cover guard 74 (shown in phantom lines). The bolt 72 is slidable inward-toward and outward-away from the jaw 60 and carries a clamp head 76 having an opening 78 to receive the jaw detent 62 and a release shoulder 80 spaced from the clamp head 76. A locking lever 90 extends through the space between clamp head 76 and release shoulder 80 from a pivot pin 92 by which it is pivotally secured to the underside of the fifth wheel plate 40. It will be seen that the bolt 72 (with clamp head 76 and shoulder 80) is biased to move inward toward the jaw 60 by a compression spring 94 mounted between a wall of one pocket 50 and the bolt clamp head 76; and movement of the locking lever 90 will cause the lever 90 to push against one of the opposing faces of the clamp head 76 or shoulder 80 to thereby, respectively, move the bolt 72 inward toward jaw 60 or outward away therefrom.

When a king pin 30 has been moved forward against jaw 60 to position the jaw as shown in FIG. 3 the jaw detent 62 will be aligned with opening 78 of clamp head 76 and the bolt 72 will, normally, be driven by spring 94 to capture the detent 62 in the clamp head 76. In that condition the jaw is locked in first position against release of the king pin. If the bolt 72 is withdrawn by moving the free end of locking lever 90 outward to the right sufficiently to disengage detent 62 from the clamp head 76, as shown in FIG. 5, (referred to herein as a lock-set or second position) the jaw 60 may pivot open to release the king pin 30 upon forces being applied to separate the tractor 22 and trailer 20. When the latter occurs (as shown in FIG. 7) the jaw will pivot so as to release the king pin 30 and simultaneously swing the jaw foot 64 against the withdrawn clamp head 76, thereby moving the bolt 72 and lever 90 slightly further outward and physically blocking inward return of the bolt 72 and clamp head 76 until another trailer king pin 30 is advanced unto the slot 42 so as to move the jaw 60 forward and thereby disengage the foot 64 from the clamp head 76 (a return to the positions illustrated in FIG. 3). The full outward or third position is referred to as unlocked.

The foregoing description covers fifth wheel functional component parts that are prior art and have heretofore been known although the specific locking bolt may be of new design. The present invention is largely directed to the following operating system to manually move or restrict movement of the locking lever and to provide a redundant safety lock and indicator latch.

As may be seen in FIGS. 3, 5 and 7 the free end of locking lever 90 is bent to curve under a lateral reinforcing web 46 and terminates in the form of a closed eyelet 96. (In prior apparatus the locking lever extended through a slot formed in the web resulting in a relatively weaker fifth wheel structure.) The eyelet 96 encompasses a crank 100 in an operating rod, generally 102, which extends from an inner rod follower end 104 outwardly through a port 106 in the fifth wheel skirt 44 to a handle 108. As may be seen in FIGS. 9, 10 and 11 the handle 108 and follower 104 are bent substantially at right angles to a straight shaft 110 and to one another. Two latching splines 112 and 114 are formed on or welded to the shaft 110 at an angle to one another and at acute angles to the follower end 104. The splines are off-set but overlap as shown in FIGS. 9 and 10.

Located adjacent to the exterior end of port 106 in skirt 44 is a "V" shaped aperture 122, aligned to receive the respective splines 112 and 114 when the operating rod is in an intermediate posture as hereinafter explained. An indicator latch generally 130 is pivotally mounted on the outside of skirt 44 above the aperture 122 and includes a pointer arm 132 and a cam face 134 as best shown in FIGS. 4, 6 and 8. The cam face 134 is engagable by spline 112 and will cause the pointer arm to move in coordination with rotational movement of the handle 108 and rod follower 104.

Again referring to FIGS. 3, 5 and 7 it will be seen that the follower 104 cooperates with a guide means 140 corresponding to the positions of the locking mechanism and is confined to travel in a groove or track which is cast or secured to the underside of the fifth wheel plate 40. The groove 140 is of generally "Z" configuration having three successive legs 142, 144 and 146. When the jaw 60 is closed and locked by the sliding bolt 72 (FIG. 3) the locking lever 90 will be pivoted fully inwardly and operating rod 102 will be fully inward with follower 104 in the first leg 142 of groove 140. In this condition a driver is instructed that the handle 108 is to be rotated fully downward (clockwise as in FIG. 4) whereby follower 104 will be blocked from the second leg 144 thus locking the position of bolt 72. The spline 114 will have been drawn fully inwardly of skirt 44. Also shaft 110 and spline 112 will be rotated so as to allow the latch pointer arm 132 to be horizontal and spline 114 will be misaligned with the aperture 122 thereby providing a redundant lock against movement of bolt 72 sufficient to release clamp 76 from the jaw detent 62. The tractor 22 and trailer 20 are securely joined for safe operation.

When it is desired to separate the trailer 20 from tractor 22 a driver must manually grip the handle 108, rotate it counterclockwise to the extend permitted by follower 104 in the second leg 144 of groove 140 and pull the operating rod 102 outwardly until the follower 104 reaches the third leg 146 of groove 140. The aforesaid handle rotation will align both splines 112, 114 with the aperture so they will not block withdrawal of the operating rod shaft 100. This will pivot the locking lever outwardly to withdraw the bolt 72 to the lock set or second position thereby separating clamp 76 from the jaw detent 62.

At the same time the rotation of spline 112 against the cam face 134 of indicator latch 130 will lift the pointer arm 132 thereby visually indicating an unlocked condition.

It will be understood that the compression spring 94 resists the outward movement of bolt 72 and tends to return the clamp 76 to engage detent 62. However, return movement is prevented by the handle 108 being further rotated counterclockwise so as to engage the follower 104 against a step 148 of leg 146. A redundant catch is provided by spline 112 which, at this position, is fully withdrawn from the skirt 44 and rotated with shaft 110 so as to be misaligned with the outer side of aperture 122 so that it is blocked from inward movement. At this point the forward end of trailer 20 is supported on jacks, or the like, and the tractor 22 is driven forward so as to cause jaw 60 to pivot open and separate horizontally from the king pin 30. As the jaw 60 pivots open, the foot portion 64 moves clamp 76 and bolt 72 slightly outwardly thereby pivoting locking lever 90 further outwardly so as to move the operating rod 102 and disengage follower 104 from the step 148.

In the latter condition the weight of handle 108 will cause the shaft 110 to rotate clockwise so as to align the follower 104 with the second leg 144 of groove 140 and to align both splines 112, 114 with the aperture 122. The pointer arm 132 of indicator latch 130 will remain held at an angle by spline 112. Thus the locking mechanism generally 70 is ready to be returned to a locked position by spring 94 upon the jaw 60 being pivoted closed by action of another king pin when the tractor 22 is manipulated to engage the fifth wheel 24 with another trailer 20.

Upon the latter occurrence the jaw foot 64 moves out of contact with clamp 76 and spring 94 propels the bolt 72 and clamp 76 inwardly to fully engage detent 62 within the clamp opening 78. The consequent inward motion of the follower 104 through grove leg 144 and the weight of handle 108 causes the follower 104 to rotate into leg 142 of the groove 140 where it is blocked against outward movement. At the same time the splines 112, 114 are drawn inward and rotate with shaft 110 so as to release the indicator latch 130 and return pointer arm 132 to a horizontal position indicating a locked condition; and spline 114 is fully inward of skirt 44 and misaligned with aperture 122 so as to provide a redundant catch preventing unlocking motion of the locking mechanism generally 70.

The foregoing details have been provided to describe a best mode of the invention and further variations and modifications may be made without departing from the spirit and scope of the invention which are defined in the following claims.

What is claimed is:

1. In a fifth wheel apparatus for over the road tractors of the type comprising a depending skirt about the periphery of an underside of said fifth wheel and having a pivotable jaw to engage a trailer king pin and a locking mechanism on said underside engagable with said jaw to secure and release said jaw, the improvement comprising:
    an operating rod connected to said locking mechanism and extending through a port in said skirt on said underside of said fifth wheel, said operating rod having a shaft with a follower at one end beneath said fifth wheel and a handle at an opposite end exterior of said fifth wheel;
    and a guide means on the underside of said fifth wheel, spaced from said skirt, said guide means receiving said follower of said operating rod and including sections which define locked and unlocked positions of said locking mechanism.

2. The fifth wheel apparatus of claim 1 wherein said guide means and said port cooperate to maintain said operating rod at a given level and limit movement thereof to substantially longitudinal and rotary motion with respect to said shaft.

3. The fifth wheel apparatus of claim 1 wherein said shaft includes at least a first spline along a portion thereof;
    an aperture in said skirt adjacent said port and positioned to receive said spline;
    and an indicator latch pivotally secured to the exterior of said skirt adjacent said aperture in a position to be contacted by said first spline and responsive to the rotary position of said operating rod.

4. The fifth wheel apparatus of claim 3 wherein said shaft includes a second spline at an angle to and offset from said first spline, said second spline being misaligned with said aperture when said follower is in a locked position with respect to said guide means and locking mechanism.

5. The fifth wheel apparatus of claim 1 wherein said guide means is a groove which receives said follower of said operating rod.

6. The fifth wheel apparatus of claim 5 wherein said groove includes three legs corresponding with locked, lockset and unlocked positions of said locking mechanism.

7. The fifth wheel apparatus of claim 1 including a crank in said operating rod between said follower and said shaft, said crank being connected to an end of a lever operatively connected to move with said locking mechanism.

8. In a fifth wheel apparatus for over the road trucks of the type having a pivotable jaw to engage and hold a king pin of a trailer resting on said fifth wheel and a locking bolt slidably mounted on the underside of the fifth wheel to be moveable inwardly and outwardly between positions of engagement and disengagement with said jaw to thereby lock and unlock the jaw, the improvement comprising:
    a locking lever pivotally secured to the underside of said fifth wheel to one side of said locking bolt, said locking lever being operatively connected to said locking bolt;
    a single operating rod connected to said locking lever, said operating rod having a shaft extending outwardly of said fifth wheel to a handle, said shaft extending through holding means beneath said fifth wheel, said holding means confining said operating rod to longitudinal and rotary movement thereof;
    and guiding means beneath said fifth wheel engaged by said operating rod, said guiding means defining a sequence of rotary and longitudinal movements imparted to said shaft through said handle, said movements corresponding to positions of said locking bolt.

9. The fifth wheel apparatus of claim 8 wherein said locking lever extends between a clamp head and a release shoulder on said locking bolt.

10. The fifth wheel apparatus of claim 8 wherein a free end of said locking lever is an eyelet and one end of said operating rod extends through said eyelet.

11. The fifth wheel apparatus of claim 10 wherein said one end of said operating rod includes a crank which extends through said eyelet.

12. The fifth wheel apparatus of claim 8 wherein guiding means is a groove on the underside of said fifth wheel and said operating rod includes a follower at an inner end of said shaft said follower being held in said groove.

13. The fifth wheel apparatus of claim 10 wherein said operating rod includes a follower extending substantially normal to the rotational axis of said shaft and a crank between said follower and said shaft which crank extends through said eyelet of said locking lever; and said guiding means is a groove on the underside of said fifth wheel said groove receiving said follower and said groove including distinct legs corresponding with locked and unlocked positions of said locking bolt.

14. The fifth wheel apparatus of claim 13 wherein said groove includes three legs corresponding with locked, lockset and unlocked positions of said locking bolt.

15. The fifth wheel apparatus of claim 13 wherein a skirt depends from said fifth wheel and said shaft extends onwardly through a port therein and at least a first spline along a portion of said shaft;
an aperture in said skirt adjacent said port and positioned to receive said spline;
and an indicator latch pivotally secured to the exterior of said skirt adjacent said aperture in a position to be contacted by said first spline and responsive to the rotary position of said operating rod.

16. The fifth wheel apparatus of claim 15 wherein said shaft includes a second spline at an angle to and offset from said first spline, said second spline being misaligned with said aperture when said follower is in a locked position with respect to said guide means and locking mechanism.

17. In a fifth wheel apparatus for over the road trucks of the type having a movable jaw to engage a trailer king pin and a locking bolt mounted to the underside of the fifth wheel to be movable between positions of engagement and disengagement with said jaw, the improvement comprising:
a locking lever pivotally secured to the underside of said fifth wheel to one side of said locking bolt and operatively connected thereto;
a single operating rod connected to said locking lever, said operating rod extending through holding means beneath said fifth wheel said means confining said operating rod to longitudinal and rotary movements, said operating rod including a follower to cooperate with a groove member on said underside of said fifth wheel;
said groove member comprising groove legs which receive said follower in positions defining a sequence of rotary and longitudinal movements which correspond with locked and unlocked positions of said locking bolt.

18. The fifth wheel apparatus of claim 17 wherein said holding means includes a port in a skirt depending from an edge of said fifth wheel and wherein said operating rod includes at least a first spline along a portion thereof, and an aperture in said skirt adjacent said port said aperture being positioned to receive said spline.

19. The fifth wheel apparatus of claim 18 wherein said operating rod includes a second spline at an angle to an offset from said first spline, said second spline being misaligned with said aperture when said follower is in a locked position with respect to said groove legs.

* * * * *